(12) United States Patent
Wilson et al.

(10) Patent No.: US 9,188,193 B2
(45) Date of Patent: Nov. 17, 2015

(54) CABLE LOCKING DEVICE

(71) Applicant: ERICO International Corporation, Solon, OH (US)

(72) Inventors: Eric J Wilson, Solon, OH (US); Raymond S Laughlin, Middlefield, OH (US); Edward J Lynch, Akron, OH (US); Matthew Bennett, Cleveland, OH (US)

(73) Assignee: ERICO International Corporation, Solon, OH (US)

( * ) Notice: Subject to any disclaimer, the term of this patent is extended or adjusted under 35 U.S.C. 154(b) by 98 days.

(21) Appl. No.: 13/706,721

(22) Filed: Dec. 6, 2012

(65) Prior Publication Data

US 2013/0139358 A1    Jun. 6, 2013

Related U.S. Application Data

(60) Provisional application No. 61/567,210, filed on Dec. 6, 2011.

(51) Int. Cl.

| | |
|---|---|
| *F16G 11/04* | (2006.01) |
| *F16G 11/10* | (2006.01) |
| *F16L 3/14* | (2006.01) |
| *H02G 3/00* | (2006.01) |
| *H02G 3/30* | (2006.01) |

(52) U.S. Cl.
CPC .............. *F16G 11/04* (2013.01); *F16G 11/106* (2013.01); *F16L 3/14* (2013.01); *H02G 3/263* (2013.01); *H02G 3/30* (2013.01); *Y10T 24/3969* (2015.01); *Y10T 29/49826* (2015.01)

(58) Field of Classification Search
USPC ......... 24/136 R, 115 M, 122.3; 403/211, 284, 403/374.1, 409.1, 314, 304; 405/302.2
See application file for complete search history.

(56) References Cited

U.S. PATENT DOCUMENTS

| | | | |
|---|---|---|---|
| 516,555 A | 3/1894 | Smith | |
| 544,724 A | 8/1895 | Cotton et al. | |

(Continued)

FOREIGN PATENT DOCUMENTS

| | | |
|---|---|---|
| CH | 687221 A5 | 10/1996 |
| KR | 100639601 B1 | 10/2006 |
| WO | 2011004152 A1 | 1/2011 |

OTHER PUBLICATIONS

International Search Report and Written Opinion from corresponding International Application No. PCT/US12/068162.

(Continued)

*Primary Examiner* — Robert J Sandy
*Assistant Examiner* — Michael Lee
(74) *Attorney, Agent, or Firm* — Renner, Otto, Bioselle & Skalr, LLP

(57) ABSTRACT

A device is used for gripping and securing cable for the purpose of suspending objects or loads. The device may be a two-barrel device that allows the user to create a loop of cable to secure to a hanging load, or to a structural member. The user of the locking device feeds the cable through one barrel, around an object to be suspended, and through the other barrel. The device has carriers installed in sockets in a housing, with wedge-shape jaws in openings in the carriers able to engage the cable and hold the cable within the device. Pushing or pulling of the carrier is used to release the spring force pressing the jaws inward, allowing the cable to be removed from the device.

20 Claims, 5 Drawing Sheets

(56) References Cited

U.S. PATENT DOCUMENTS

| | | |
|---|---|---|
| 849,832 A | 4/1907 | Collins |
| 862,840 A | 8/1907 | Collins |
| 929,851 A | 8/1909 | Hess |
| 1,069,135 A | 8/1913 | Heberling |
| 1,144,403 A | 6/1915 | Powers |
| 1,144,430 A | 6/1915 | Powers |
| 1,257,040 A | 2/1918 | Steuemagel |
| 1,391,457 A | 9/1921 | Buckley et al. |
| 1,495,258 A | 5/1924 | Duty |
| 1,547,677 A | 7/1925 | Ouellet |
| 1,590,280 A | 6/1926 | Burnett |
| 1,655,734 A | 1/1928 | McWilliams |
| 1,674,045 A | 6/1928 | James |
| 1,720,037 A | 7/1929 | Entwistle et al. |
| 1,792,439 A | 2/1931 | Nelson |
| 1,875,274 A | 8/1932 | Soule |
| 1,959,985 A | 5/1934 | Moll |
| 2,056,036 A | 9/1936 | Catron et al. |
| 2,166,457 A | 7/1939 | Berndt |
| 2,177,816 A | 10/1939 | Wertman |
| 2,190,661 A | 2/1940 | Hauer |
| 2,315,196 A | 3/1943 | Gallione |
| 2,327,683 A | 8/1943 | Warner et al. |
| 2,356,209 A | 8/1944 | Brilhart |
| 2,476,731 A | 7/1949 | Hobbs, Jr. |
| 2,487,853 A | 11/1949 | Coons |
| 2,520,325 A | 8/1950 | Moore |
| 2,554,387 A | 5/1951 | Saul |
| 2,572,615 A | 10/1951 | Hansen |
| 2,679,709 A | 6/1954 | DuBois |
| 2,699,589 A | 1/1955 | Redell |
| 2,819,923 A | 1/1958 | Anderson |
| 2,893,670 A | 7/1959 | Adams, Jr. |
| 2,916,785 A | 12/1959 | Daugert |
| 2,966,653 A | 12/1960 | Jugle |
| 2,998,625 A | 9/1961 | Huber |
| 3,003,149 A | 10/1961 | Grashow |
| 3,019,504 A | 2/1962 | Castagliuolo |
| 3,058,713 A | 10/1962 | Nemire et al. |
| 3,094,755 A | 6/1963 | Casanave |
| 3,171,624 A | 3/1965 | Leahy |
| 3,341,909 A | 9/1967 | Havener |
| 3,564,664 A | 2/1971 | Dage |
| 3,614,140 A | 10/1971 | Nestor |
| 3,638,980 A | 2/1972 | Kleinhenn |
| 3,776,586 A | 12/1973 | Ahlgren et al. |
| 3,868,748 A | 3/1975 | Kelly |
| 3,910,546 A | 10/1975 | Connors |
| 4,019,705 A | 4/1977 | Habuda, Sr. et al. |
| 4,129,927 A | 12/1978 | Anderson |
| 4,141,117 A | 2/1979 | Van Gompel |
| 4,178,661 A | 12/1979 | Klein |
| 4,195,678 A | 4/1980 | Pinchback |
| 4,202,644 A | 5/1980 | Soussloff |
| 4,216,568 A | 8/1980 | Anderson |
| 4,266,756 A | 5/1981 | Anderson |
| 4,328,605 A | 5/1982 | Hutchison et al. |
| 4,406,047 A | 9/1983 | Jeffers et al. |
| 4,424,609 A | 1/1984 | Boden |
| 4,519,564 A | 5/1985 | Nadherny |
| 4,570,885 A | 2/1986 | Heath |
| 4,600,334 A | 7/1986 | Soussloff |
| 4,622,723 A | 11/1986 | Krauss |
| 4,634,205 A * | 1/1987 | Gemra ............... 439/391 |
| 4,943,016 A | 7/1990 | Hennecke |
| 5,015,023 A | 5/1991 | Hall |
| 5,020,192 A | 6/1991 | Gerlach |
| 5,147,145 A | 9/1992 | Facey et al. |
| 5,197,166 A | 3/1993 | Meier et al. |
| 5,278,353 A | 1/1994 | Buchholz et al. |
| 5,282,825 A | 2/1994 | Muck et al. |
| 5,334,056 A | 8/1994 | Hlinsky |
| 5,369,849 A | 12/1994 | De France |
| 5,374,135 A | 12/1994 | Folsom et al. |
| 5,423,108 A | 6/1995 | Brennan |
| 5,548,873 A | 8/1996 | Macias |
| 5,551,901 A | 9/1996 | Jaeger |
| 5,594,977 A | 1/1997 | McCallion |
| 5,621,952 A | 4/1997 | Frano |
| 5,649,340 A | 7/1997 | Ida |
| 5,671,505 A | 9/1997 | Anscher |
| 5,737,808 A | 4/1998 | Ikeda |
| 5,947,424 A | 9/1999 | Heath |
| 6,003,210 A | 12/1999 | Facey et al. |
| 6,012,691 A | 1/2000 | van Leeuwen et al. |
| 6,058,574 A | 5/2000 | Facey et al. |
| 6,098,942 A | 8/2000 | Heath |
| 6,361,243 B1 | 3/2002 | Geib |
| 6,898,905 B1 | 5/2005 | Kirschner |
| 7,007,350 B1 | 3/2006 | Franke |
| 7,039,987 B2 | 5/2006 | van Gijsel et al. |
| 7,150,078 B2 | 12/2006 | van Gijsel et al. |
| 7,304,243 B2 | 12/2007 | Polidori |
| 7,346,962 B2 | 3/2008 | van Gijsel et al. |
| 2004/0195556 A1 | 10/2004 | Facey et al. |
| 2004/0231268 A1 | 11/2004 | Facey et al. |
| 2005/0042059 A1 | 2/2005 | Bremer |
| 2005/0071958 A1 | 4/2005 | Toimil |
| 2005/0230582 A1 | 10/2005 | Birli et al. |
| 2006/0214073 A1 | 9/2006 | Mominee et al. |
| 2007/0017689 A1 | 1/2007 | Polidori |
| 2008/0277536 A1 | 11/2008 | Olle et al. |
| 2010/0037554 A1 | 2/2010 | Oh |
| 2010/0279540 A1 | 11/2010 | Shawcross et al. |

OTHER PUBLICATIONS

"Electrical and Low Voltage/Datacom Fasteners", ERICO CADDY, Copyright 2003, 7 pgs.

"Fixing and Supports for Heating and Plumbing Installations", ERICO CADDY, 3 pgs.

"Spring Steel Fasteners", B-Line, Copyright 1995, 5 pgs.

"Speed Link, Universal Support System", ERICO CADDY, Copyright 2003, 8 pgs.

Extended European Search Report for corresponding European Application No. 12854641.3, mailed May 29, 2015.

* cited by examiner

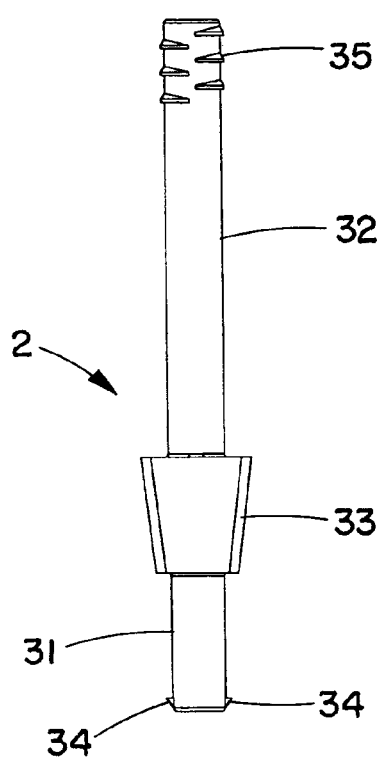
Figure 15
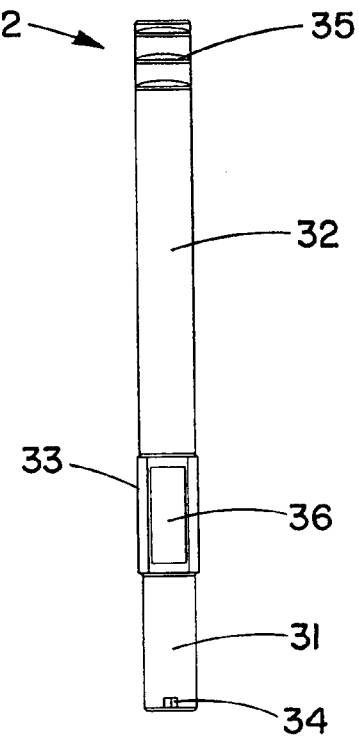
Figure 16
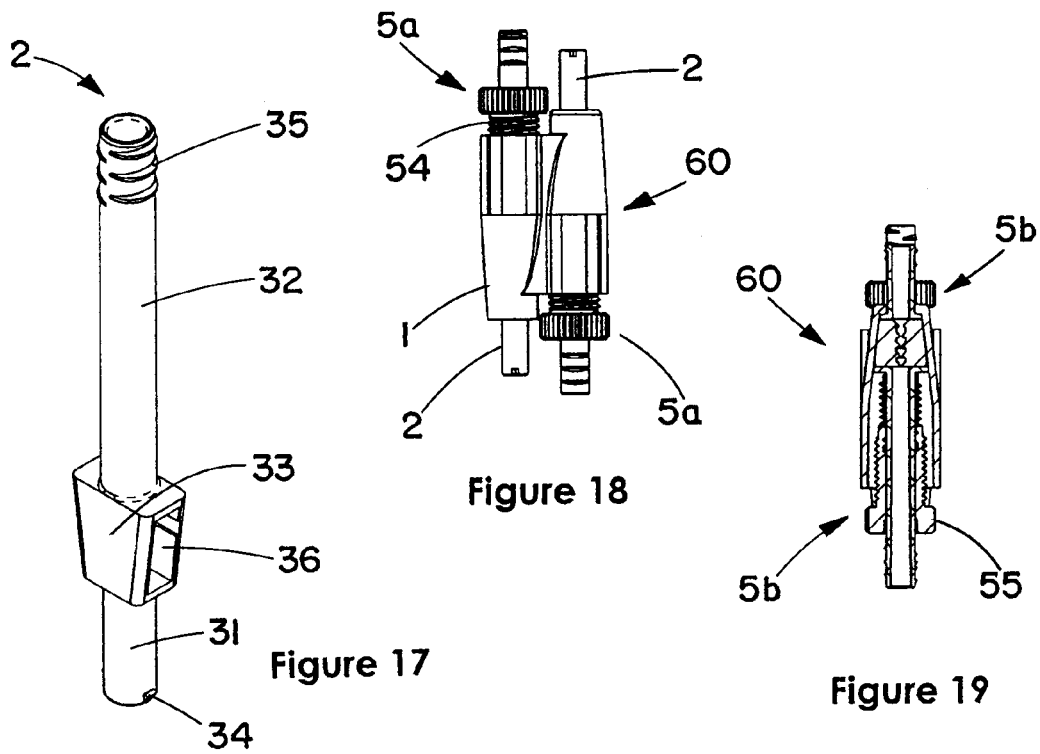
Figure 17
Figure 18
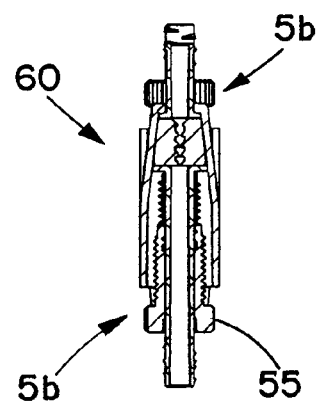
Figure 19

CABLE LOCKING DEVICE

This application claims the benefit under 35 USC 119 of U.S. Provisional Application 61/567,210, filed Dec. 6, 2011, which is incorporated herein by references in its entirety.

TECHNICAL FIELD OF THE INVENTION

This invention relates generally to cable locking devices for suspension systems, such as a system for suspending or hanging facilities such as cables, pipe, conduit, or duct, for example.

DESCRIPTION OF THE RELATED ART

In building construction and reconstruction, utilities and other facilities such as piping, conduit, duct, light fixtures, and communications wiring, for example, are commonly supported from building structural elements such as beams, purlins, trusses, roofs, or concrete floors above a suspended ceiling. These facilities are usually secured in place by a wide variety of hangers or suspenders, ranging from clips or clamps to wire or chain. Examples of such construction fasteners and hangers are sold under the well-known CADDY trademark by ERICO International Corporation of Solon, Ohio U.S.A. Wires have been widely used for suspension of such items including the suspended ceiling itself.

Wire or cable kits have also been employed for suspension purposes and examples may be seen in U.S. Pat. Nos. 2,819,923 and 6,003,210. Both use a wire sling with a loop at one end and an adjustable cleat forming a loop around the object suspended. The problem with both is that the bottom or free end of the length of wire or cable has to be passed over the structural object, through the loop on the upper end, and then pulled tight. If the cleat is on the wire, it may have to be removed and reattached, particularly if there is a clearance problem above or through the structural object. The thread-through loop system of the prior patents also limits the possibility of securing the length of wire to the suspended or stayed object first, and then to the structure for final adjustment. Some suspended objects require lateral stability, particularly in seismic zones, so that the length of wire is not always plumb. Also, the wire may be used to form a horizontal catenary between two structural members and from which additional wire slings may be used to support or stay other objects.

The noted prior patents illustrate cleats for forming adjustable loops where the cleat is designed to accommodate a single or limited size of wire. Also, both use a low angle wedge surface to grip the wire against a linear surface. In the earlier patent, the wedge surface is the threads of the set screw. If adjustment or repositioning is required, it is not always easy to release the grip on the wire, or a special tool may be required. It would be desirable if the cleat would accommodate a range of wire sizes, and for each provide a tighter, more secure grip, and yet one which is easily released.

Another prior suspension system is that disclosed in U.S. Pat. No. 7,346,962. That patent describes a type of device currently marketed by ERICO.

Some current cable-locking devices require an unlocking key or small flat blade screwdriver to release the jam cleat and all for adjustment of the cable in the direction of locking of the jam cleat or bearings. Due to the difficulty in releasing the jam cleat to lower a suspended load, most installers position their suspended assemblies low and raise the cable through the device slowly in the free direction of the jam cleat or bearings until they reach the desired elevation.

In some circumstances, installers have not been educated on this approach. In other circumstances, the installer overshoots the final position. For both, it is necessary to temporarily unlock the device and lower the cable through the device. In the current device the unlocking is accomplished with the use of a key or tool that the installer must carry with them, and insert into the device to unlock the jam cleat. These extra motions during the installation are time consuming, with little value added.

It would also be desirable to have a cleat which optionally can be locked in its cable or wire gripping condition so that seismic anomalies or vibrations cannot release the wire or cable, even momentarily.

SUMMARY OF THE INVENTION

Given the foregoing, it is desirable to include a means of unlocking the device without the use of tools. In addition, ball-locking type devices use a carrier to house the locking balls and keep them moving together. Present devices of this type on the market use a rigid carrier.

According to an aspect of the invention, a device has a plurality of wedging means, which lower initial loading friction by replacing action of cable sliding on housing with only smooth wedges sliding on the housing. This action increases the speed of engagement on the cable. Another benefit of multiple jaws is an increase in gripping area, reducing stress and increasing opportunity to grip.

According to another aspect of the invention, a flexible jaw carrier/cage contains wedging means for release by push or pull without the potential for accidental loss of load.

According to yet another aspect of the invention, distribution of stress is handled through arrangement of loads. These loads include a tension load, due to object being suspended, that is in a direction Y. Clamping load due to the jaw wedging pressure is in a direction Z. Loading from a widely spread cable, surrounding a large object or object in close proximity to the device, is in a direction X. Directions X, Y, and Z are orthogonal, and equivalent to a standard 3-axis coordinate system. This distribution of stress into multiple directions reduces the principle stresses within the housing, allowing for a smaller design and thinner housing.

According to still another aspect of the invention, an embodiment of the device has a secondary locking mechanism.

According to a further aspect of the invention, an embodiment of the device has a seismic secondary lock.

According to a still further aspect of the invention, an unlocking mechanism of the device is easier to apply with one hand or while wearing gloves than other solutions.

According to another aspect of the invention, a cable locking device includes: a housing; and at least two jaws within the housing. The housing includes a tapered section that engages the jaws to press the jaws inward. The device may include one or more of the following features: a carrier passing through the housing, for receiving a cable therein; the carrier is a tube; the carrier is flexible; the carrier is made of plastic; the carrier extends out of both ends of the housing; the carrier can be pushed to release the cable; the carrier can be pulled to release the cable; the carrier can be pushed or pulled to release the cable; the jaws are located in openings in the carrier; the carrier includes retention means for retaining the carrier partially within the housing; the jaws have gripping inner surfaces; the jaws have toothed inner surfaces for engaging the cable; the engagement of the jaws with the tapered section; wedging means engagement of jaws that engage cable, and that are engaged with housing; a spring within the housing biases the carrier such that the jaws engage the tapered section of the housing; the housing has two cable-receiving openings for receiving and securing different parts of the cable (or different cables); a secondary locking mechanism for securing the device from release; the secondary locking mechanism includes a locking screw that is tightened to prevent release of the jaws under seismic, or other intermittent loading condition; the secondary locking mechanism includes a locking screw that has a shear-off head; and/or the device distributes stress through arrangement of loads along different axes, for example reducing principal stresses within the housing.

According to yet another aspect of the invention, a cable locking device includes: a housing; a flexible carrier passing through a socket in the housing, for receiving a cable therein; and at least two jaws within the socket. The housing includes an engagement section that engages the jaws to press the jaws inward, to secure a cable that is within the carrier.

According to still another aspect of the invention, a method of securing a cable around an object includes: passing a cable end of the cable through a cable locking device in a first direction, including passing the cable end in the first direction through a first flexible carrier that is in a first socket in a housing of the device; after passing the cable end through the cable locking device in the first direction, looping the cable end around the object; and passing the cable end through the cable locking device in a second direction, including passing the cable end in the second direction through a second flexible carrier that is in a second socket in the housing.

According to a further aspect of the invention, a cable locking device includes: a housing; a flexible carrier passing through a socket in the housing, for receiving a cable therein; and a jaw within the socket. The housing includes an engagement section that engages the jaw to press the jaw inward, to secure a cable that is within the carrier.

According to a still further aspect of the invention, a method of securing a cable around an object includes: passing a cable end of the cable through a cable locking device in a first direction, including passing the cable end in the first direction through a first flexible carrier that is in a first socket in a housing of the device; after passing the cable end through the cable locking device in the first direction, looping the cable end around the object; and passing the cable end through the cable locking device in a second direction, including passing the cable end in the second direction through a second flexible carrier that is in a second socket in the housing.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various features of the invention.

FIG. 15 is a side view of a carrier of the device of FIG. 3B.

FIG. 16 is an end view of the carrier of FIG. 15.

FIG. 17 is an oblique view of the carrier of FIG. 15.

FIG. 18 is an oblique view of a device according to another embodiment of the invention.

FIG. 19 is a side sectional view of a device according to yet another embodiment of the invention.

DETAILED DESCRIPTION

A device is used for gripping and securing cable for the purpose of suspending objects or loads. The device may be a two-barrel device that allows the user to create a loop of cable to secure to a hanging load, or to a structural member. The user of the locking device feeds the cable through one barrel, around an object to be suspended, and through the other barrel. The device has carriers installed in sockets in a housing, with wedge-shape jaws in openings in the carriers able to engage the cable and hold the cable within the device. Pushing or pulling of the carrier is used to release the spring force pressing the jaws inward, allowing the cable to be removed from the device.

Figure 1:
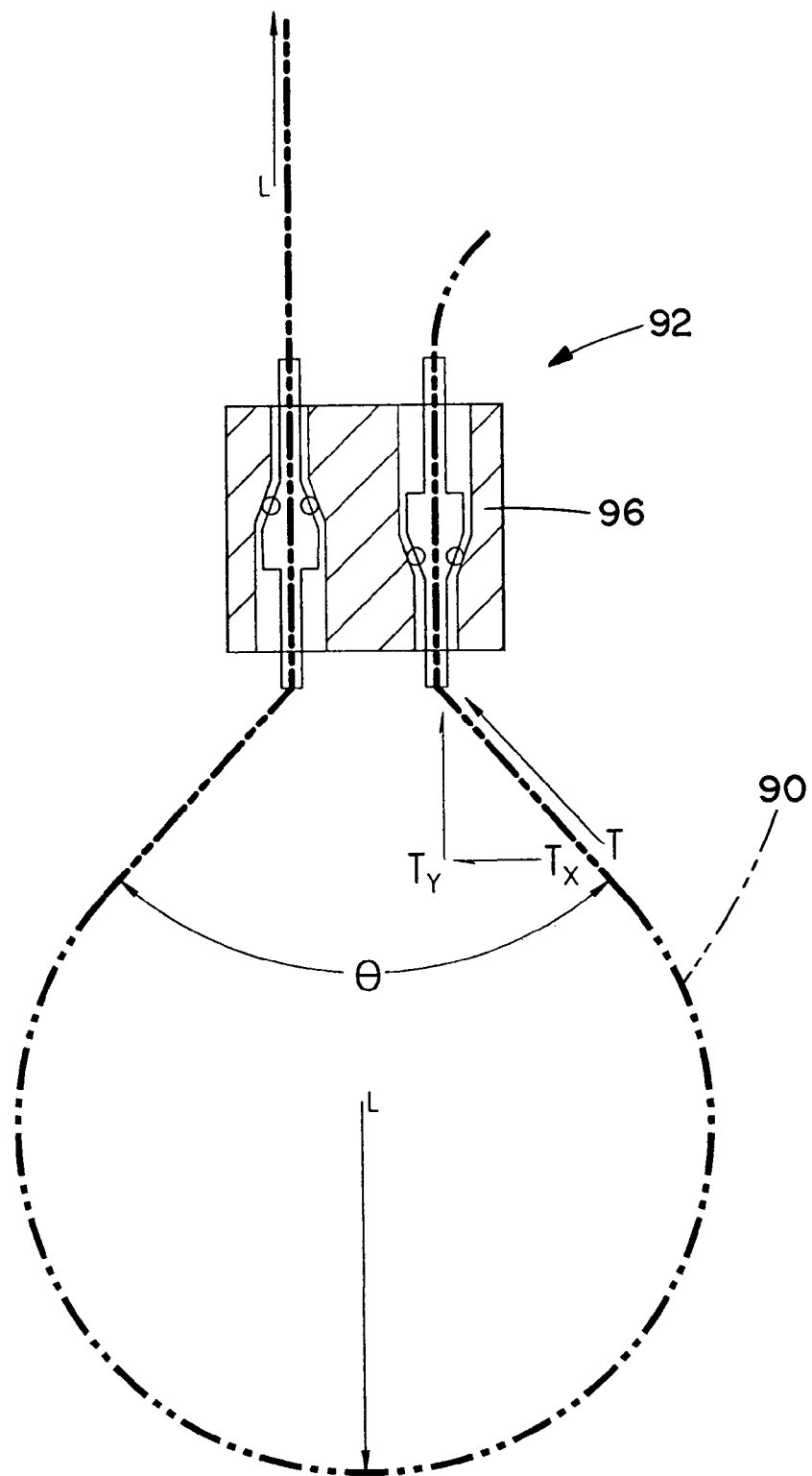
FIG. 1 is a side view illustrating the situation involved in using a cable and device for suspending a load or otherwise coupling to an object.
Figure 2:
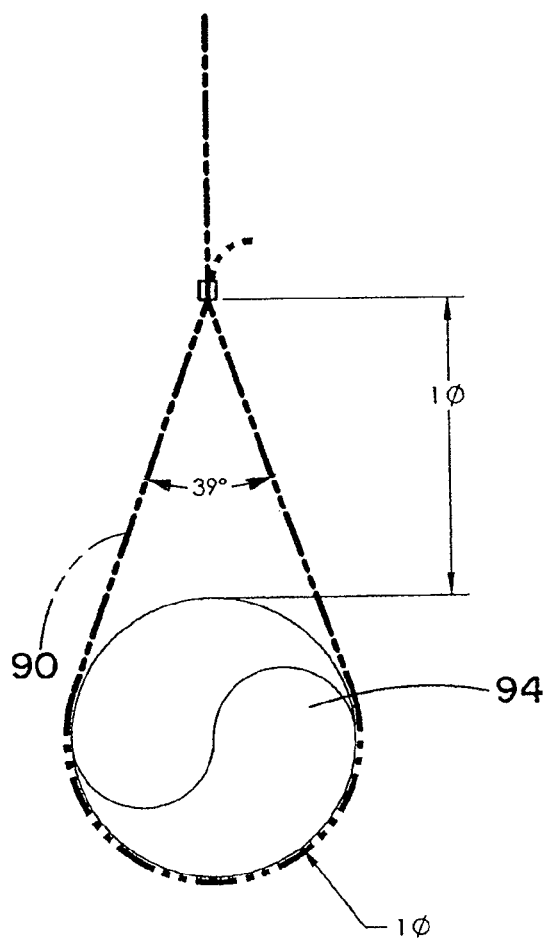
FIG. 2 is another side view illustrating the situation involved in using a cable and device for suspending a load or otherwise coupling to an object.

Referencing FIGS. 1 and 2, as an angle $\Theta$ of a securing cable 90 increases (the angle at which is located a securement device 92 to get around an object 94 to be secured, shown in FIG. 2), the force component $T_y$ increases. In combination with the tension in the cable 90 from a suspended load, such as from the object 94, the forces resolve to an upward force on a carrier 96 that secures the cable 90, or is on a protruding plunger. The upward force causes a release of the gripping mechanism and the suspended load.

It has been found that a rigid portion of, or connection to, the gripping means that extends beyond the protection of the housing can lead to accidental release of the device at wide-angle loading. To date, three methods have been employed to avoid an accidental release. The first is to limit the loading angle. Angles may be limited to 30 or 39 degrees, for example as illustrated in FIG. 2. This may be expressed as a limit to the distance between the gripping device 92 and the object 94, again as illustrated in FIG. 2.

The second is to limit the length of the carrier. In this approach the carrier does not protrude beyond the end of the housing. Thus, the upward loading is transferred directly to the device housing. This provides a safe installation, but requires the use of a key to unlock the grip for adjustment.

The third approach is the use of a locking nut, such as described in U.S. Patent Pub. No. 2010/0037554 A1. The gripping plungers extending beyond the housing have threaded outer surfaces to engage a nut. When tightened, the nut transfers this same upward loading to the device housing. This provides a keyless means for adjustment. However, it is complex and presents other limitations to the wide-angles.

The present solution described below may involve the use of a flexible carrier. The use of polypropylene (or another flexible plastic material) allows the carrier to conform to the cable without producing an upward unlocking force on the gripping jaws.

Some installations are in locations that are never concealed. An example of such a structure is a room without a drop ceiling as is common in a "big box" store. In these installations, architects or building owners either do not want to see the device, or want to have a more aesthetically pleasing device. A smaller, streamlined, device is more aesthetically pleasing on installations where the cable-locking device will be visible. Positioning the device closer to the object being suspended aids with concealing the cable-locking device on exposed installations. In a loop configuration, the included angle of the cable under the device increases the closer the device is to the suspended object. Loading at a wider angle imparts horizontal loading components to the housing and increases tension in the cable.

To overcome both of these challenges, the device must make efficient use of material and possess a superior design. An advantage to the small size is that it's easier to conceal the device and more difficult to see from a distance. A disadvantage is that the smaller size has less material to handle the stress of typical applied loads, and the increased stress of wide-angle loading. The increased tension in the cable must also be offset by a lower stress concentration from the gripping means.

Referring to FIGS. 3A-17, a cable-gripping or cable locking device 60 (FIG. 3B) includes a housing 1, carriers 2, jaws 3 (FIGS. 7A and 7B), springs 4 (FIGS. 7A and 7B), and a retainer 5. These components work in concert to automatically grip a cable and facilitate easy adjustment of the cable position.

Figure 3A:
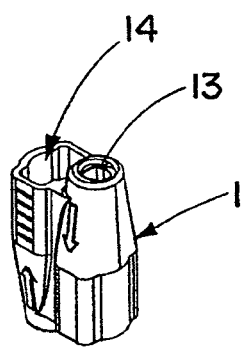
FIG. 3A is an oblique view housing of a device for gripping and securing a cable, such as for the purpose of suspending objects or loads, in accordance with an embodiment of the invention.
Figure 10:
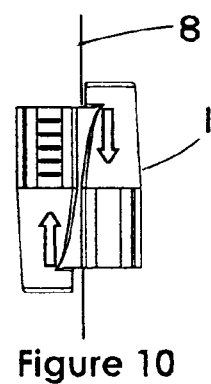
FIG. 10 is a side view of the housing.
Figure 12:
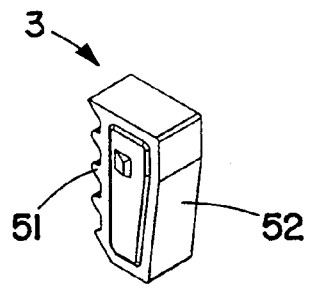
FIG. 12 is an oblique view of a jaw of the device of FIG. 3B.
Figure 11:
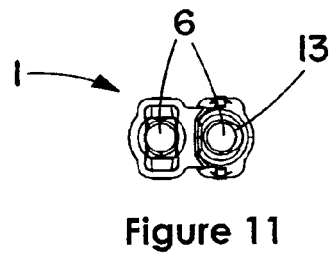
FIG. 11 is plan partially sectional view of the device of FIG. 3B.
Figure 13:
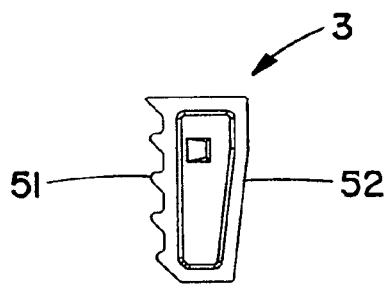
FIG. 13 is a side view of the jaw of FIG. 12.
Figure 14:
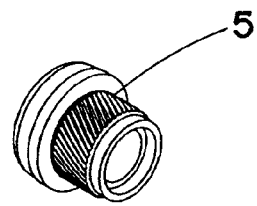
FIG. 14 is an oblique view of a retainer of the device of FIG. 3B.

The housing 1, shown in FIG. 3A, is the base component of the assembly. It contains, at least partially, all other components. Within the housing are sockets 6 (FIG. 8) arranged along two axes 7, parallel to each other and a Y-axis, and separated equally along an X-axis from a central plane 8, as shown in FIG. 10. The sockets are 6 generally tapered from one end to the other. The direction of taper of the two sockets 6 is opposite, such that the action of components arranged along each axis 7 is opposite, as best seen in FIG. 8.

Figure 8:
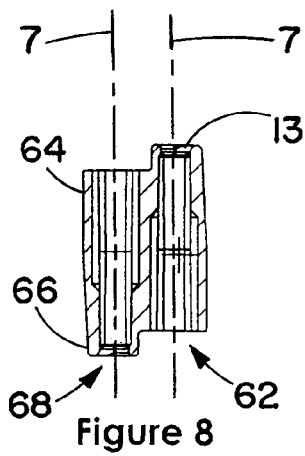
FIG. 8 is a side sectional view of a housing of the device of FIG. 3B.

Thus, with reference to FIG. 8, a first socket 62 is wider at a first end 64 of the housing 1 than at a second end 66 of the housing 1. The other socket, a second socket 68, is wider at the second end 66 of the housing 1 than at the first end 64. The housing 1 may have a pair of guide arrows 70 and 72 (FIG. 3B) that indicate the path that a cable 78 is supposed to travel. The cable 78 goes through the first socket 62 in a first direction, around an object 82, and through the second socket 68 in a second direction that is opposite to the first direction. The object 82 may be a pipe or other object to be supported or suspended, or may be a structure or another object used as a support, for example to support suspended objects.

Figure 9:
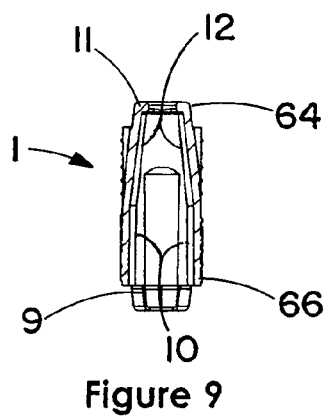
FIG. 9 is another side section of the housing of the device of FIG. 3B.

The sockets 6 are each generally rectangular in cross-section with an open end (wider end) and a closed end (narrower end). Alternatively the sockets 6 may have other suitable cross-section shapes. With reference in addition to FIG. 9, the open socket end 9 has minimal taper (at most), creating substantially parallel walls 10. Adjacent a closed socket end 11, one pair of opposite walls 12 of the socket taper inward as depth from the open end increases. The inward taper is in the direction of a Z-axis (the axis running the direction between the wide end 9 and the narrow end 11), perpendicular to X- and Y-axes. The inward taper of the walls 12 presses the jaws 3 (FIGS. 7A and 7B) radially inward as the carrier 2 (FIGS. 7A and 7B) moves upward in the Z-direction. The closed end 11 terminates with a round or elongated hole 13 extending through the housing. Superimposed on the entry end of the socket is a round hole 14 to receive a retainer or retaining means 5 for retaining the internal components.

The wedging angle, of the inclined surfaces 12, is an intermediate-self-locking taper. Under higher loads, the jaws 3 will lock themselves in place. However, during installation, fingers can release the jaws 3 easily.

The housing 1 may be made of a zinc die cast material. Alternate materials/methods include metal injection molding (MIM), powdered metal (PM), plastic injection molding, machining, and investment casting.

The carrier 2 provides guidance and alignment between the cable, the jaws 3, and the housing 1. By capturing the jaws 3 along the socket axis 7 (FIG. 8), the carrier 2 provides a tool-less means of disengaging the jaws 3 from the cable. With reference to FIGS. 15-17, the carrier 2 has three portions: an entrance tube portion 31, an exit tube portion 32, and a central cage portion 33 between the portions 31 and 32.

The entrance tube portion 31 and exit tube portions 32 are generally circular. The outer surfaces of the portions 31 and 32 guide the carrier 2 within the housing 1. The inner passage of the portions 31 and 32 guides the cable 78 (FIG. 3B) into, and away from, the central cage portion 33. Adjacent the entrance end of the entrance tube 31 is a carrier retainer or carrier retention means 34, such as a pair of diametrically-opposed barbs or ramps on the outer surface of the entrance portion 31, used for retaining the carrier 2 in the housing 1. The retainer 34 resists passage through the narrower (closed) end 11 (FIG. 9) of the sockets 6. Adjacent the exit end of the exit tube is means for gripping (a grip) 35 on the carrier 2. The grip 35 facilitates gripping of the carrier 2 using fingers, to release the cable gripping mechanism of the device 60.

The central cage portion 33 may have a polygonal shape, such as a trapezoidal shape. The cage portion 33 has openings or windows 36 for receiving the jaws 3. The openings 36 are perpendicular to the main axis (the axis 7) shared by the carrier 2 and the socket 6 within the housing 1. The openings 36 are generally rectangular and sized to mate slidingly with the jaws 3. The openings 36 receive the jaws 3 and keep the jaws 3 in place. The interior channel in the carrier 2 is accessible through the openings 36 to allow the jaws 3 to contact and grip a cable running through the carrier 2, as described in further detail below.

In application, the portions of the jaw carrier 2 that are external to the housing 1 are flexible and conform to the cable 78. Using a material with high elastic recovery, and high elongation-at-break, the tubular portions 31 and 32 bend with the cable 78, yet can recover for adjustment. The flexibility further increases the load capacity of the device 60 by eliminating upward (unlocking) forces from the carrier 2 onto the jaws 3. The carrier 2 may be made of polypropylene or another suitable flexible plastic material.

Figure 3B:
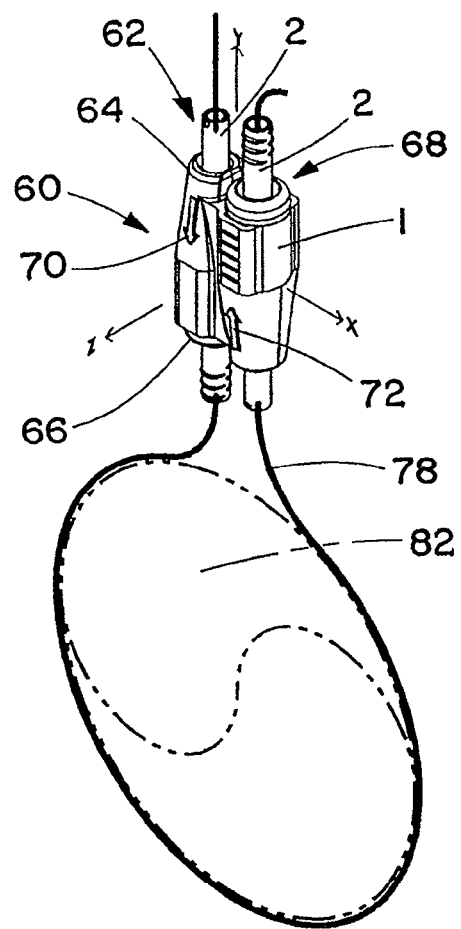
FIG. 3B is a view showing the device that the housing of FIG. 3A is a part of, used for securing an object, with a cable.
Figure 4:
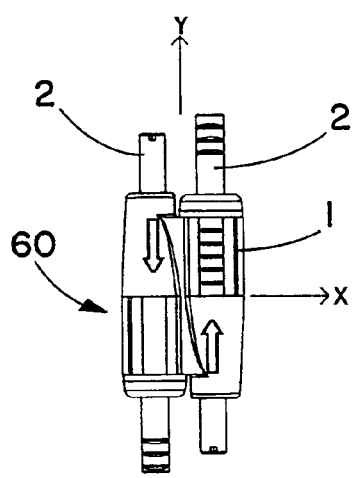
FIG. 4 is a side view of the device of FIG. 3B.
Figure 5:
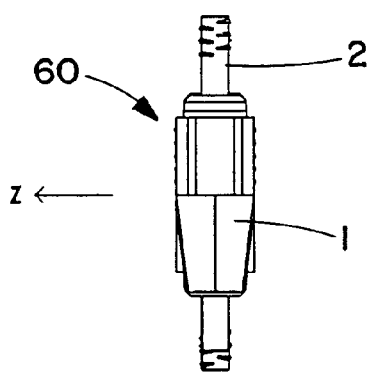
FIG. 5 is an end view of the device of FIG. 3B.
Figure 6:
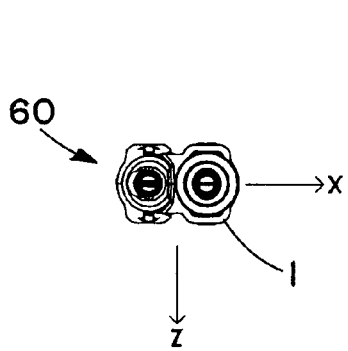
FIG. 6 is a plan view of the device of FIG. 3B.

The jaw 3 is substantially wedge shaped, with an angle to match the housing. The jaw 3 has a gripping surface 51 opposite a wedging surface 52. The gripping surface 51 may have gradated teeth to minimize stress concentration, but still allow biting into or other engagement with the cable 78 (FIG. 3B).

The jaws 3 may be formed of powdered metal. Alternatives are MIM, fine blanking, and machining through traditional and non-traditional (EDM) methods.

Figure 7A:
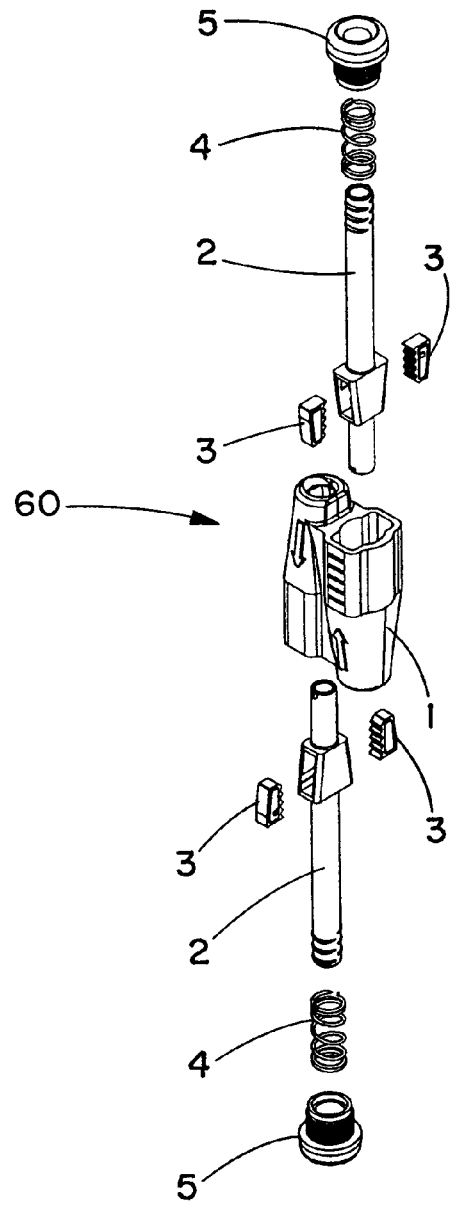
FIG. 7A is an exploded view of the device of FIG. 3B.
Figure 7B:
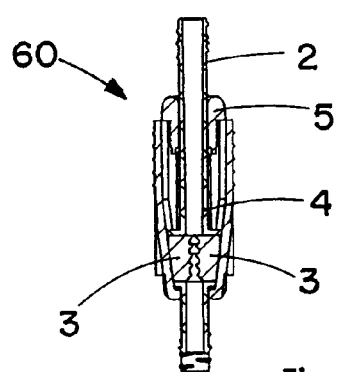
FIG. 7B is a sectional view of the device of FIG. 3B.

Various types of retainers or retaining means 5 may be used to retain the spring 4, the jaws 3, and the carrier 2, within the housing 1. According to one embodiment, the retainer 5 (FIG. 14) is a drive-screw is used as a retaining means. The retainer 5 has a recess 58 ending in a ledge 59. The recess 58 and the ledge 60 are uses to retain one end of the spring 4 (FIG. 7A).

With reference to FIGS. 3A-7B, the device 60 operates as follows. The cable 78 is threaded through the housing 1 and the carriers 2, first through the socket 62, then around the object 82, and finally through the socket 68. Threading the cable 78 through the sockets 62 and 68 causes the carriers 2 to move in the directions that the portions of the cable 78 are moved through, against the spring force from the springs 4 (compressing the springs 4). This releases the jaws 3, allowing the cable 78 to slide between the pairs of the jaws 3. After the cable 78 is threaded through the housing 1 and the carriers 2, and the cable 78 is released, the springs 4 push the jaws 3 against the tapered walls 12 (FIG. 9). The pushes the jaws 3 inward in the carrier openings 36 (FIG. 16), causing the gripping surfaces 51 of the jaws 3 to press against, and perhaps bite into, the cable 78.

To release the cable 78, the appropriate carrier 2 is pushed or pulled in a direction against force from the spring 4, compressing the spring 4. This is the same direction that the cable 78 was threaded through the carrier 2 during installation. The pulling may be accomplished by gripping the grip 35 and pulling on the carrier 2 in the direction away from the housing 1. Alternatively the opposite end of the carrier 2, the entrance portion 31 (FIG. 1), in the direction toward the housing 1. This releases the force pressing the jaws 3 inward, and allows the cable 78 to slide past, out of the carrier 2 and the housing 1. This operation may be performed for one or both of the carriers 2.

According to another embodiment (FIG. 18), the retainer 5a is a hollow thumbscrew 54 is used as a retaining means for the device with secondary locking. The screw mates with an optional thread within the superimposed bore, in each socket of the housing. After installation, the secondary locking screw is tightened to prevent release of the jaws under seismic, or other intermittent loading condition.

According to yet another embodiment (FIG. 19), the retainer 5b includes a secondary locking screw that has a shear-off head 55 to ensure that the torque applied is applied within a specified range. The torque on the screw applies a pre-load to the wedging means greater than the operating seismic loads, preventing any movement of the cable through the locking device during a seismic event.

In application, the stress in the device is distributed in all three principal directions. Stress from the suspended load is transferred through the device along the Y-Axis. Stress from a wide included-angle load is along the X-axis. Stress due to clamping of the wedges is along the Z-axis. This distribution allows for more efficient use of the housing material, leading to a more compact device.

One advantage for the devices described herein is the ability to push or pull to keylessly unlock the device. Another advantage is that a lower stress distribution and continuous body design does not split under greater side loading from wide-angle loads. In addition, the combination of a flexible carrier tube and wedge-shape jaws that lock by friction prevent the device from unlocking at angles. A problem of devices with rigid tubes is that the cable, when at an angle, will cause the device to unlock and fail until the cable angle is reduced sufficiently to relieve the pressure on the release tube.

The jaw carrier may be made of a plastic such as polypropylene, which has high elongation and elastic recovery. Metal or other plastics are alternatives, but not optimal for the application.

The wedging angle may be on the order of (about) 6°. A lesser angle increases the ability to self-lock. A greater angle increases the ease of release for adjustment. An angle of about 6 degrees is a good compromise for locking function and ease of use. Other suitable angles may be used as alternatives.

The illustrated embodiment is configured with two wedges per cable. Alternatively, three or more grippers could be used to engage the cable. In addition the illustrated embodiment is a two-sided device, but a single-sided device is an alternative, engaging one cable or a cable in one place.

As another alternative, the cable locking device may have only a single jaw for securing the cable in each of the sockets. The sockets may be modified as appropriate, with only one side wall tapered to engage a single jaw in each socket, to press the jaw inward to engage the cable. The other parts of the device may also be suitably modified, with the carriers each having only a single opening or window for receiving a single jaw, for example. In other ways, the single-jaw embodiment may be similar to the embodiments described above.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A cable locking device comprising:
   a housing;
   a flexible carrier passing through a socket in the housing, for receiving a cable therein; and
   a jaw within the socket;
   wherein the housing includes an engagement section that engages the jaw to press the jaw inward, to secure a cable that is within the carrier;
   wherein the carrier has an opening for the cable to move relative to the carrier; and
   wherein pressing the jaw inward prevents movement of the cable relative to the carrier when the cable is inside the opening.

2. The device of claim 1, further comprising an additional jaw within the socket, wherein the engagement section also engages the additional jaw to press the additional jaw inward.

3. The device of claim 1, wherein at least part of the carrier is a tube.

4. The device of claim 1, wherein the engagement section is a tapered section of the housing.

5. The device of claim 4, further comprising a spring that pushes the jaw against the tapered section, thereby urging the jaw inward.

6. The device of claim 5, wherein the carrier can either be pushed or pulled against force from the spring to release the cable.

7. The device of claim 1,
wherein the housing has an additional socket therein;
further comprising:
an additional flexible carrier passing through the additional socket in the housing, for receiving the cable therein; and
an additional jaw within the additional socket; and
wherein the housing includes an additional engagement section that engages the additional jaw to press the additional jaw inward, to secure the cable within the additional carrier.

8. The device of claim 7, wherein the socket and the additional socket preferentially receive the cable in opposite directions passing therethrough.

9. The device of claim 7,
wherein the jaw is part of a pair of jaws that are within the socket, for engaging the cable within the socket; and
wherein the additional jaw is part of an additional pair of jaws that are within the socket, for engaging the cable within the additional socket.

10. The device of claim 1, further comprising a secondary locking mechanism to limit movement of the carrier relative to the housing to prevent release of the jaw.

11. The device of claim 10, wherein the secondary locking mechanism includes a locking screw that is tightened to prevent release of the jaw under seismic, or other intermittent loading condition.

12. The device of claim 10, wherein the secondary locking mechanism includes a locking screw that has a shear-off head.

13. A cable locking device comprising:
a housing;
a flexible carrier passing through a socket in the housing, for receiving a cable therein; and
a jaw within the socket;
wherein the housing includes an engagement section that engages the jaw to press the jaw inward, to secure a cable that is within the carrier;
wherein the carrier includes:
a tubular entrance portion;
a tubular exit portion; and
a central portion between the entrance portion and the exit portion; and
wherein the jaw is located in an opening in the central portion, for directly engaging the cable.

14. The device of claim 13, wherein one of the entrance portion or the exit portion includes a grip to aid gripping of the carrier.

15. The device of claim 13, wherein the entrance portion and the exit portion both extend beyond the housing, at opposite respective endings of the housing.

16. The device of claim 13, wherein at least part of the central portion has a rectangular cross-section shape; and
wherein at least part of the socket has a rectangular cross-section shape.

17. A cable locking device comprising:
a housing;
a flexible carrier passing through a socket in the housing, for receiving a cable therein, the flexible carrier having an entrance portion and an exit portion; and
a jaw within the socket;
wherein the housing includes an engagement section that engages the jaw to press the jaw inward, to secure a cable that is within the carrier; and
wherein the entrance portion and the exit portion both extend beyond the housing, at opposite respective ends of the housing, thereby eliminating an unlocking force from acting upon the jaw via the carrier when an angle of the cable increases, and allowing keyless unlocking of the jaw for adjustment.

18. The device of claim 17, wherein at least one of the entrance portion of the exit portion includes a grip to aid gripping of the carrier.

19. The device of claim 17, further comprising an additional jaw within the socket, wherein the engagement section also engages the additional jaw to press the additional jaw inward.

20. The device of claim 17,
wherein the housing has an additional socket therein;
the device further comprising:
an additional flexible carrier passing through the additional socket in the housing, for receiving the cable therein; and
an additional jaw within the additional socket; and
wherein the housing includes an additional engagement section that engages the additional jaw to press the additional jaw inward, to secure the cable within the additional carrier.

* * * * *